O. C. BORNHOLT.
TRANSMISSION MECHANISM.
APPLICATION FILED AUG. 20, 1913.
1,112,429.
Patented Oct. 6, 1914.
2 SHEETS—SHEET 2.
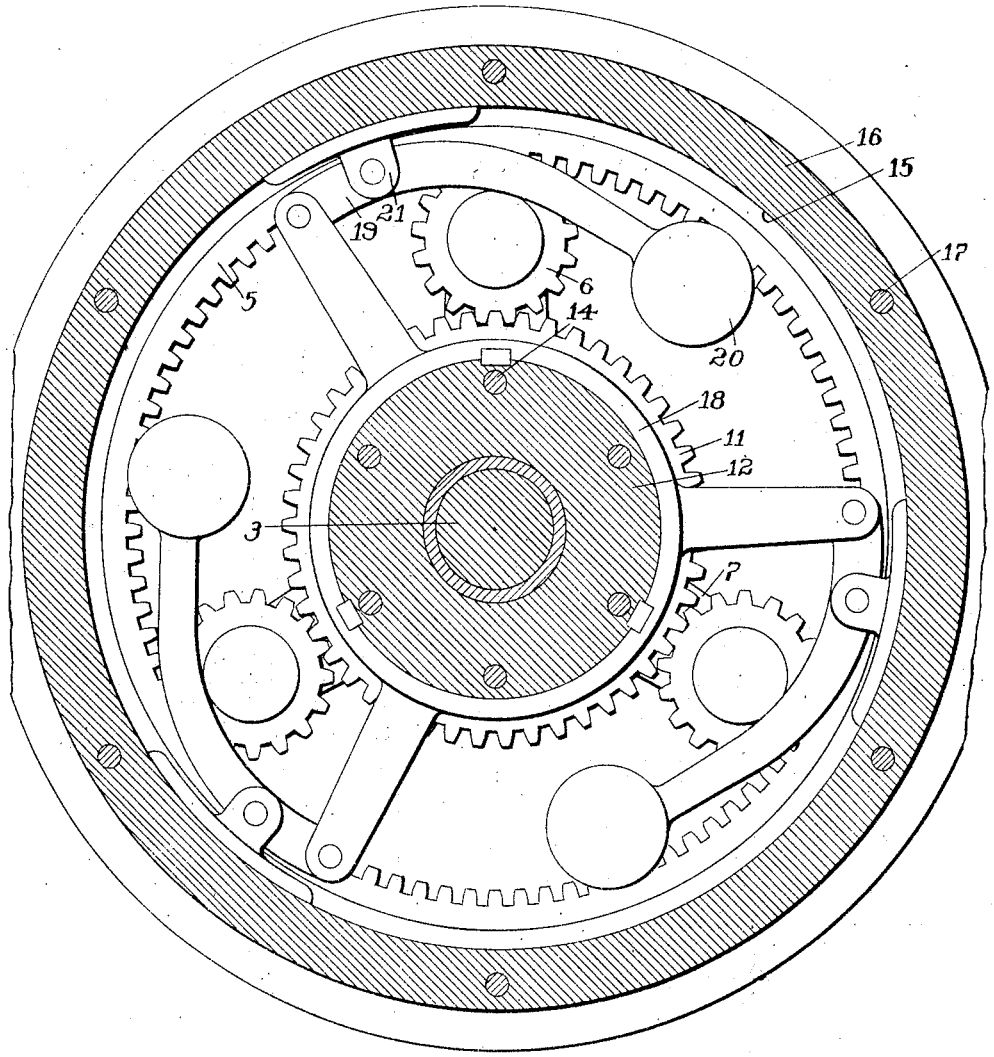
Fig. T
Witnesses
Anna N. Dore
Chas. W. Stauffiger
Inventor
Oscar C. Bornholt,
By
Attorneys

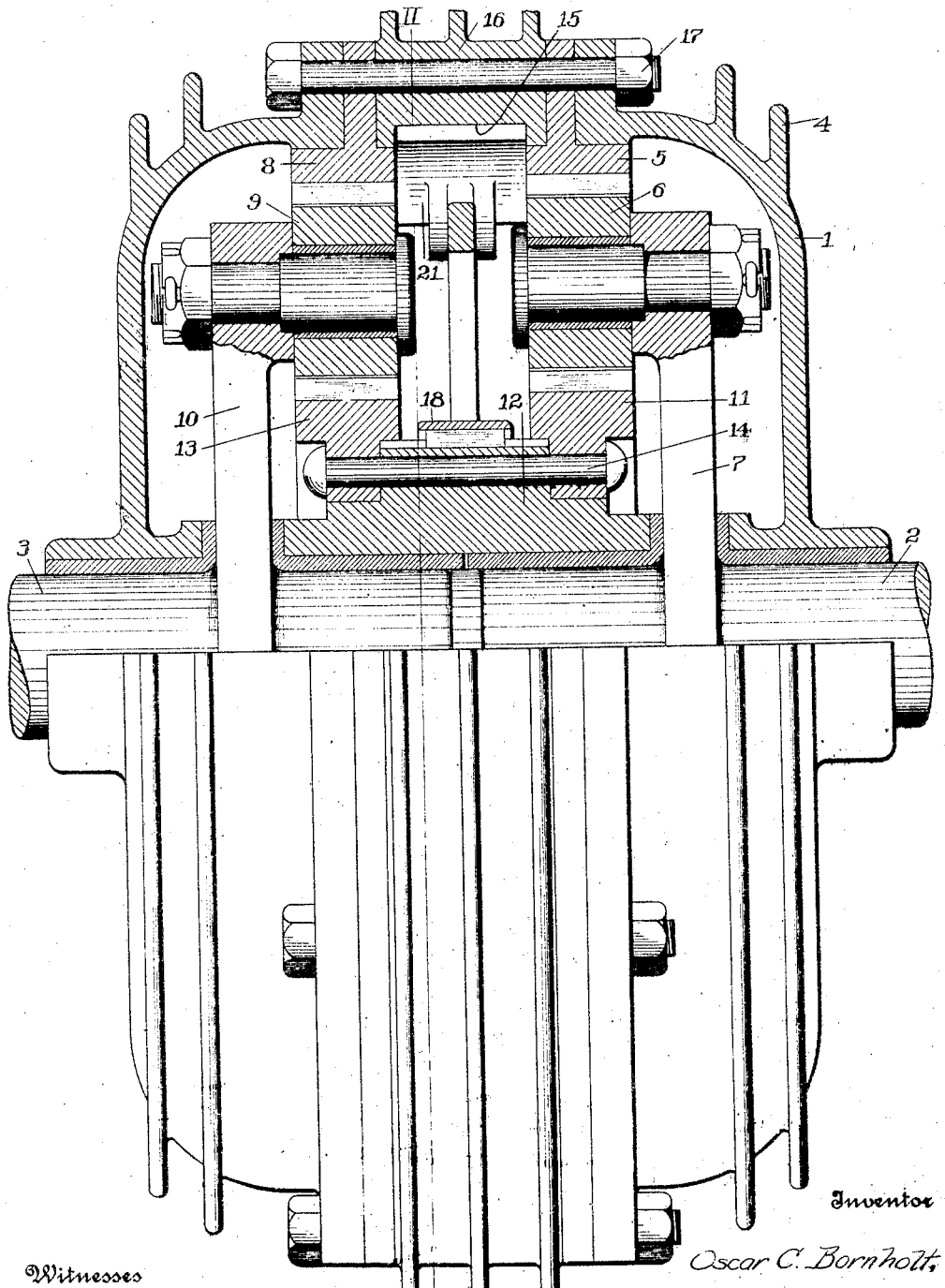
Fig. I.

OSCAR C. BORNHOLT, OF DETROIT, MICHIGAN.

TRANSMISSION MECHANISM.

1,112,429.  Specification of Letters Patent.  Patented Oct. 6, 1914.

Application filed August 20, 1913.  Serial No. 785,611.

*To all whom it may concern:*

Be it known that I, OSCAR C. BORNHOLT, a citizen of the United States of America, residing at Detroit, in the county of Wayne and State of Michigan, have invented certain new and useful Improvements in Transmission Mechanism, of which the following is a specification, reference being had therein to the accompanying drawings.

Where internal combustion motors are used, as in automobiles and the like, the full power of the motor is rarely available as it is only developed when the motor is at high speed.

This invention relates to a transmission mechanism whereby the torque at the driven shaft is always equal to the full motor power, the mechanism being so arranged that it automatically varies its speed of transmission to accommodate its increase or decrease of load on the driven shaft, the driving shaft rotating at constant speed.

The invention consists in the matters hereinafter set forth and particularly pointed out in the appended claims.

In the drawings, Figure 1 is a view partially in transverse section and partially in elevation of one form of mechanism that embodies features of the invention; and Fig. 2 is a view in section on line II—II of Fig. 1.

As herein shown an external hollow casing 1 is journaled on the adjacent end portions of a drive shaft 2 and a follower shaft 3 alined therewith. The casing may be of any preferred design for strength and lightness and may have external ribs as indicated at 4 for air cooling purposes. An internal annular gear 5 is mounted in the casing concentrically with the shaft 2 and is in mesh with one or more planet pinions 6 that are journaled on studs mounted on a drive plate 7 that is secured to the shaft 2. An internal annular follower gear 8 in spaced relation to the gear 5 and concentric relation to the shaft 3, is likewise secured in the casing 1 in mesh with one or more follower planet pinions 9 that are rotatably secured on a plate 10 keyed or secured to the follower shaft 3. An intermediate drive gear 11 that is mounted concentrically with the shaft 2, meshes with the drive planet pinion 6. A sleeve 12 to which the gear 11 is secured and in which the end portions of the shafts 2 and 3 are journaled likewise carries a follower intermediate gear 13 in mesh with the planet pinion 9. As a matter of construction the gears 11 and 13 may be secured to the sleeve 12 by pins 14 or the like.

An annular friction face 15 is formed on the casing 1 concentrically with the shafts 2 and 3 and between the planes of revolution between the pinions 6 and 9. Preferably the face constitutes the inner periphery of a friction ring 16 that is secured between the end portions of the casing 1 as by studs 17 or the like as an integral part thereof. A plate or disk 18 is secured or keyed on the sleeve 12 to turn therewith. Suitably arranged weight levers 19 are pivoted on the lugs or projections of the plate 18 and are provided at their outer ends each with a centrifugal weight 20. A friction shoe 21 is pivoted to each lever between the ends thereof with its working face arranged to conform to and frictionally engage the friction surface 15 of the casing or ring.

Suitable ratios between the planet pinions and the engaging gears in the casing and on the shafts, give the required relation of speed between the drive and follower shafts necessary to move any load imposed on the follower shaft up to the full capacity of the motor at high speed and the transmission gearing at low speed. As the casing, which revolves slowly, under the initial effect of the train, reaches full speed, the weight balls throw the friction shoes into engagement with the rounded casing and thereby lock the latter so that the follower shaft is driven at full speed of the drive shaft.

It is to be understood that the gears are so proportioned that unless resistance is found in the follower shaft as against the driving power plant, the follower shaft does not turn. When any resistance however slight is encountered by the follower shaft, the differential permits the gradual picking up of the latter under the continued impulse of the drive shaft. As soon as the weights are thrust into action by the revolutions of the casing, the latter is locked to turn with the end of the shafts and thereby form a direct drive connection.

The speed of rotation of the casing is always greater than that of the shafts, through proper proportioning of the gearing, and as it turns in opposite direction to the shafts, the quickened grip of the shoes on the casing is very powerful so that the weights and levers are not necessarily of large proportions, while they are very effective in carrying out their purpose.

Obviously, changes in the details of construction may be made without departing from the spirit of my invention and I do not care to limit myself to any particular form or arrangement of parts.

What I claim is:—

1. In a transmission mechanism, a main shaft, a follower shaft alined therewith, an intermediate gear rotatably secured on the shafts, a casing rotatable on the shafts as a housing for the gears, a pair of internal gears secured to the casing concentrically with the shafts, a set of planetary pinions mounted on the end of each shaft, each set intermeshing both with the intermediate gear and with the companion internal gear, and means operated by centrifugal force for locking the casing to turn in unison with the intermediate gear.

2. In a transmission mechanism, a main shaft, a follower shaft alined therewith, an intermediate gear mounted concentrically on the adjacent ends of the shafts, sets of planetary pinions each secured on the end of a shaft in mesh with the intermediate gear, a casing rotatably secured on the shafts as a housing for the gears, annular gears in the casing each in mesh with the planetary pinions, and means for frictionally engaging the casing to turn with the intermediate gear when the casing approaches a predetermined speed.

3. In a transmission mechanism, a main shaft, a follower shaft alined therewith, an intermediate gear journaled on the adjacent end portions of the shafts, sets of planetary pinions each secured to a shaft to revolve around the latter in mesh with the intermediate gear, a casing rotatably secured on the shafts as a housing for the gears, internal annular gears secured to the casing each in mesh with the said planetary pinions, and centrifugal weight levers mounted to revolve with the intermediate gear and arranged to frictionally engage the casing to turn the latter with the intermediate gear.

4. In a transmission mechanism, a main shaft, a follower shaft alined therewith, a sleeve journaled on the adjacent end portions of the shafts, a pair of annular gears secured in spaced relation on the sleeve, the sleeve and annular gears forming a unitary intermediate gear, centrifugal weight levers mounted on the sleeve to revolve therewith, sets of planetary pinions each secured to a shaft in mesh with the intermediate gears, a casing rotatable on the shafts as a housing for the gears, and annular internal gears secured in the casing each in mesh with a set of planetary pinions, the casing being frictionally engaged by the centrifugal weight levers to turn in unison with the intermediate gear when the casing approaches a predetermined rate of speed.

5. In a transmission mechanism, a main shaft, a follower shaft alined therewith, a sleeve journaled on the adjacent end portions of the shafts, a pair of annular gears secured in spaced relation on the sleeve, the sleeve and gears forming a unitary intermediate gear, centrifugal weight levers pivoted on extensions of the sleeve, a plate secured on each shaft, a set of planetary pinions journaled on each plate to revolve in mesh with the intermediate gear, a casing journaled on the shafts as a housing for the gears, and internal annular gears secured to the casing each in mesh with a set of planetary pinions, the casing having an internal friction face with which the centrifugal weight levers engage when the casing approaches a predetermined rate of speed.

In testimony whereof I affix my signature in presence of two witnesses.

OSCAR C. BORNHOLT.

Witnesses:
  ANNA M. DORR,
  C. R. STICKNEY.